United States Patent
Sikand et al.

(10) Patent No.: US 12,387,177 B2
(45) Date of Patent: Aug. 12, 2025

(54) RECRUITMENT PROCESS GRAPH BASED UNSUPERVISED ANOMALY DETECTION

(71) Applicant: ACCENTURE GLOBAL SOLUTIONS LIMITED, Dublin (IE)

(72) Inventors: Samarth Sikand, Jaipur (IN); Venkatesh Subramanian, Bangalore (IN); Neville Dubash, Mumbai (IN); Sanjay Podder, Thane (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 1209 days.

(21) Appl. No.: 17/152,524

(22) Filed: Jan. 19, 2021

(65) Prior Publication Data

US 2021/0224588 A1    Jul. 22, 2021

(30) Foreign Application Priority Data

Jan. 20, 2020 (IN) .............................. 202011002401

(51) Int. Cl.
| | |
|---|---|
| G06F 16/10 | (2019.01) |
| G06F 16/21 | (2019.01) |
| G06F 16/9035 | (2019.01) |
| G06F 18/2137 | (2023.01) |
| G06F 18/23 | (2023.01) |
| G06F 18/2323 | (2023.01) |
| G06N 3/04 | (2023.01) |
| G06N 5/022 | (2023.01) |
| G06Q 10/1053 | (2023.01) |

(52) U.S. Cl.
CPC ..... *G06Q 10/1053* (2013.01); *G06F 16/9035* (2019.01); *G06F 18/21375* (2023.01); *G06F 18/2323* (2023.01); *G06N 3/04* (2013.01); *G06N 5/022* (2013.01)

(58) Field of Classification Search
CPC ................................. G06N 5/022; G06N 3/04
See application file for complete search history.

(56) References Cited

PUBLICATIONS

Baoxu Shi, "Representation Learning in Heterogeneous Professional Social Networks with Ambiguous Social Connections", IEEE (Year: 2019).*

(Continued)

*Primary Examiner* — Van C Mang
(74) *Attorney, Agent, or Firm* — Mannava & Kang, P.C.

(57) ABSTRACT

In some examples, recruitment process graph based unsupervised anomaly detection may include obtaining log data associated with a recruitment process for a plurality of candidates, and generating knowledge graphs and graph embeddings. The graph embeddings may be trained to include a plurality of properties such that graph embeddings of genuine candidate hires and fraudulent candidate hires are appropriately spaced in a vector space. The trained graph embeddings may be clustered to generate a plurality of embedding clusters that include a genuine candidate cluster, and a fraudulent candidate cluster. For a new candidate graph embedding for a new candidate, a determination may be made as to whether the new candidate graph embedding belongs to the genuine candidate cluster, to the fraudulent candidate cluster, or to an anomalous cluster, and instructions may be generated to respectively retain or suspend the new candidate.

18 Claims, 9 Drawing Sheets

(56) References Cited

PUBLICATIONS

Rohan Ramanath Shi, "Towards Deep and Representation Learning for Talent Search at LinkedIn", IEEE (Year: 2018).*

Georgios Kontaxis, "Detecting Social Network Profile Cloning", IEEE (Year: 2011).*

Stuart P. Lloyd, Least squares quantization in pcm. IEEE Transactions on Information Theory, 28(2): pp. 129-136, 1982, (8 pages).

Arthur, David et al., k-means++: The advantages of careful seeding. Stanford, 2006.

Ester, Martin, et al. "A density-based algorithm for discovering clusters in large spatial databases with noise." In Kdd, vol. 96, No. 34, pp. 226-231. 1996, (6 pages).

Davidson, Ian, et al., "Agglomerative hierarchical clustering with constraints: Theoretical and empirical results." In European Conference on Principles of Data Mining and Knowledge Discovery, pp. 59-70. Springer, Berlin, Heidelberg, 2005 (12 pages).

Ankerst, Mihael, et al., "OPTICS: Ordering points to identify the clustering structure." ACM Sigmod record 28, No. 2 (1999): pp. 49-60, (12 pages).

Zhang, Tian, et al., "BIRCH: an efficient data clustering method for very large databases." ACM sigmod record 25, No. 2 (1996): 103-114, (12 pages).

Antoine Bordes et al., "Question Answering with Subgraph Embeddings", Sep. 4, 2014, 10 pages.

Antoine Bordes et al., "Learning Structured Embeddings of Knowledge Bases", Association for the Advancement of Artificial Intelligence (www.aaai.org), 2011, pp. 301-306.

Tim Dettmers et al., "Convolutional 2D Knowledge Graph Embeddings", The Thirty-Second AAAI Conference on Artificial Intelligence (AAAI-18), 2018, pp. 1811-1818.

Fucheng Liu et al., "Log2vec: A Heterogeneous Graph Embedding Based Approach for Detecting Cyber Threats within Enterprise", Session 8C:, Blockchain VI, CCS '19, Nov. 11-15, 2019, London, United Kingdom, pp. 1777-1794.

Guixiang Ma et al., "Multi-view Clustering with Graph Embedding for Connectome Analysis", CIKM'17, Nov. 6-10, 2017, Singapore, Singapore, 10 pages.

Xiao Cheng et al., "Static Detection of COntrol-Flow-Related Vulnerablities Using Graph Embedding", Conference paper—Nov. 2019, 11 pages.

Matteo Togninalli et al., "Wasserstein Weisfeiler-Lehman Graph Kernels", 33rd Conference on Neural Information Processing Systems (NeurIPS 2019), Vancouver, Canada, 11 pages.

Mathias Niepert et al., "Learning Convolutional Neural Networks for Graphs", Proceedings of the 33rd International Conference on Machine Learning, New York, NY, USA, 2016, 10 pages.

Pinar Yanardag et al., "Deep Graph Kernels", KDD'15, Aug. 10-13, 2015, Sydney, NSW, Australia, pp. 1365-1374.

Linxiao Yang et al., "Deep Clustering by Gaussian Mixture Variational Autoencoders with Graph Embedding", 2019 IEEE/CVF International Conference on Computer Vision (ICCV), Oct. 2019, pp. 6440-6449.

Mousavi et al., "Hierarchical graph embedding in vector space by graph pyramid", ScienceDirect, Pattern Recognition 61 (2017) pp. 245-254.

Shahbaz et al., "IRecruit: Towards Automating the Recruitment Process", Springer Nature Switzerland AG 2019, H.-P. Lam and S. Mistry (Eds): ASSRI 2018, LNBIP 367, pp. 139-152, 2019.

* cited by examiner

```
┌─────────────────────────────────────────────────────────┐
│ OBTAIN LOG DATA ASSOCIATED WITH AT LEAST ONE RECRUITMENT│
│ PROCESS FOR A PLURALITY OF CANDIDATES FOR AT LEAST ONE  │
│                      ORGANIZATION                        │
│                          602                             │
└─────────────────────────────────────────────────────────┘
                           │
                           ▼
┌─────────────────────────────────────────────────────────┐
│ GENERATE A PLURALITY OF KNOWLEDGE GRAPHS BY ANALYZING   │
│ THE LOG DATA, AND GENERATING, FOR EACH CANDIDATE OF THE │
│ PLURALITY OF CANDIDATES, A KNOWLEDGE GRAPH THAT INCLUDES│
│ ENTITIES ASSOCIATED WITH THE AT LEAST ONE RECRUITMENT   │
│     PROCESS AND RELATIONS BETWEEN THE ENTITIES          │
│                          604                             │
└─────────────────────────────────────────────────────────┘
                           │
                           ▼
┌─────────────────────────────────────────────────────────┐
│ GENERATE A PLURALITY OF GRAPH EMBEDDINGS BY GENERATING, │
│ FOR EACH KNOWLEDGE GRAPH OF THE PLURALITY OF KNOWLEDGE  │
│              GRAPHS, A GRAPH EMBEDDING                   │
│                          606                             │
└─────────────────────────────────────────────────────────┘
                           │
                           ▼
┌─────────────────────────────────────────────────────────┐
│   TRAIN THE PLURALITY OF GRAPH EMBEDDINGS TO GENERATE   │
│               TRAINED GRAPH EMBEDDINGS                   │
│                          608                             │
└─────────────────────────────────────────────────────────┘
                           │
                           ▼
┌─────────────────────────────────────────────────────────┐
│ CLUSTER THE TRAINED GRAPH EMBEDDINGS TO GENERATE A      │
│ PLURALITY OF EMBEDDING CLUSTERS THAT INCLUDE AT LEAST ONE│
│ GENUINE CANDIDATE CLUSTER, AND AT LEAST ONE FRAUDULENT  │
│                  CANDIDATE CLUSTER                       │
│                          610                             │
└─────────────────────────────────────────────────────────┘
                           │
                           ▼
┌─────────────────────────────────────────────────────────┐
│     RECEIVE A NEW CANDIDATE GRAPH EMBEDDING FOR A NEW   │
│                       CANDIDATE                          │
│                          612                             │
└─────────────────────────────────────────────────────────┘
                           │
                           ▼
┌─────────────────────────────────────────────────────────┐
│  DETERMINING, BY THE AT LEAST ONE HARDWARE PROCESSOR,   │
│ WHETHER THE NEW CANDIDATE GRAPH EMBEDDING BELONGS TO THE│
│ AT LEAST ONE GENUINE CANDIDATE CLUSTER OR TO THE AT LEAST│
│              ONE FRAUDULENT CANDIDATE CLUSTER            │
│                          614                             │
└─────────────────────────────────────────────────────────┘
```

RECRUITMENT PROCESS GRAPH BASED UNSUPERVISED ANOMALY DETECTION

PRIORITY

The present application claims priority under 35 U.S.C. 119(a)-(d) to Indian Provisional Patent Application number 202011002401, having a filing date of Jan. 20, 2020, the disclosure of which is hereby incorporated by reference in its entirety.

BACKGROUND

A variety of techniques may be utilized to recruit personnel for an organization. For example, credentials for different individuals may be analyzed to match a candidate to a job opening. In some cases, the credentials may be verified to prevent potential fraud associated with the recruitment process.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Recruitment process graph based unsupervised anomaly detection apparatuses, methods for recruitment process graph based unsupervised anomaly detection, and non-transitory computer readable media having stored thereon machine readable instructions to provide recruitment process graph based unsupervised anomaly detection are disclosed herein. The apparatuses, methods, and non-transitory computer readable media disclosed herein provide for recruitment process graph based unsupervised anomaly detection by utilizing a knowledge graph for auditing purposes, for example, for auditing for inconsistencies. A candidate for a job opening as disclosed herein may represent any individual person or entity that is being sought for a job opening or another such position. For the apparatuses, methods, and non-transitory computer readable media disclosed herein, the knowledge graph may be utilized for auditing purposes, for example, to provide an overview of a complete recruiting process, for identifying potential fraudulent scenarios, and for identifying possible malicious participants. In this regard, the knowledge graph may be utilized after completion of a recruitment process. For example, the knowledge graph may be utilized to determine whether proper procedures are followed when a candidate is recruited. The knowledge graph may encompass an entire process of recruiting within an organization. The apparatuses, methods, and non-transitory computer readable media disclosed herein may provide for the detection of different fraud scenarios. Further, the apparatuses, methods, and non-transitory computer readable media disclosed herein may utilize machine learning and data mining for the recruitment collusion and fraud detection.

With respect to recruitment generally, it is technically challenging to detect fraud in a recruitment process. It is also technically challenging to detect collusion between various teams/agencies within or outside an organization, and/or potential candidates. Yet further, it is technically challenging to detect biased or preferential treatment of candidates from interviewers.

The apparatuses, methods, and non-transitory computer readable media disclosed herein address the aforementioned technical challenges by providing for the auditing of a recruitment flow of a knowledge graph for every candidate. The apparatuses, methods, and non-transitory computer readable media disclosed herein may provide for generation of deeper insights into a candidate's connections. The apparatuses, methods, and non-transitory computer readable media disclosed herein may provide a coherent representation of an entire recruitment flow.

With respect to recruitment of potential candidates for an organization, multiple steps and entities/teams may be involved in an end to end recruitment process. Each team may be assigned its own role and duties. Every step may be logged into a recruitment management system. A candidate's background check may be performed, and represent a relatively expensive process. A particular team may collect documents from a candidate. The same or another team may verify a candidate's employment application form.

According to examples disclosed herein, the apparatuses, methods, and non-transitory computer readable media disclosed herein may provide for the generation of the knowledge graph for the purpose of auditing a recruitment process. The knowledge graph may include various entities/participants connected via meaningful relations. The knowledge graph may be generated based on audit trails of individual candidates, and if needed, with expertise of Human Resources or recruiting teams. The knowledge graph may be used to identify potential frauds that may occur within a recruiting process. The knowledge graph may also be used to identify people that may be involved in an identified fraud. The knowledge graph may be utilized as a tool to explain different entities, teams involved, and relationships between these entities and teams.

According to examples disclosed herein, the apparatuses, methods, and non-transitory computer readable media disclosed herein may provide for implementation of the knowledge graph to facilitate understanding, by auditors and/or human resources personnel, of a recruitment flow.

According to examples disclosed herein, the apparatuses, methods, and non-transitory computer readable media disclosed herein may provide for utilization of log data from a recruitment management system for dynamic creation of a knowledge graph, and/or for checking whether a recruitment flow has been followed in a knowledge graph.

According to examples disclosed herein, the apparatuses, methods, and non-transitory computer readable media disclosed herein may provide for identification of entities and/or nodes in a knowledge graph that have a suspicious behavior. For example, entities and/or nodes that may be potential collusion cases may be identified.

According to examples disclosed herein, the apparatuses, methods, and non-transitory computer readable media disclosed herein may provide for identification of candidate misuse of a recruitment system, which may be utilized to take appropriate action.

According to examples disclosed herein, the apparatuses, methods, and non-transitory computer readable media disclosed herein may provide for utilization of data mining to find new correlations between entities.

According to examples disclosed herein, the apparatuses, methods, and non-transitory computer readable media disclosed herein may implement rule based techniques to extrapolate a graph from logs. In this regard, the anomaly detection as disclosed herein may be unsupervised. The apparatuses, methods, and non-transitory computer readable media disclosed herein may provide for the detection of unknown collusion scenarios. Changes to a recruitment process may be accounted for based on re-training of graph embeddings as disclosed herein.

According to examples disclosed herein, the apparatuses, methods, and non-transitory computer readable media disclosed herein may generate heterogeneous graphs from logs. A unique log may be maintained in a system for each candidate. A log may record the process information related to a candidate. Temporal changes may be captured for all attributes (e.g., 69 attributes) present in logs. Rules may be implemented to extrapolate different types of entities, relations attributes of relations, and relationships between different entities.

According to examples disclosed herein, the apparatuses, methods, and non-transitory computer readable media disclosed herein may generate graph embeddings for the graphs. An entire log (as opposed to a log entry) may be converted into an n-dimensional vector. The graphs for genuine hires may vary slightly. The graph embeddings may be trained to include a property that specified graph representations in vector space are close. In this regard, a modification may be performed on top of a graph embedding and hybrid embedding algorithms as disclosed herein.

According to examples disclosed herein, the apparatuses, methods, and non-transitory computer readable media disclosed herein may utilize unsupervised learning (e.g., clustering) to detect anomalies in embedding clusters. Various types of deep learning based clustering techniques may be used to obtain optimal clusters. In this regard, in addition to identification of known genuine and fraudulent hires, anomaly clusters which may point to unknown types of fraud may also be detected.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

Figure 1:
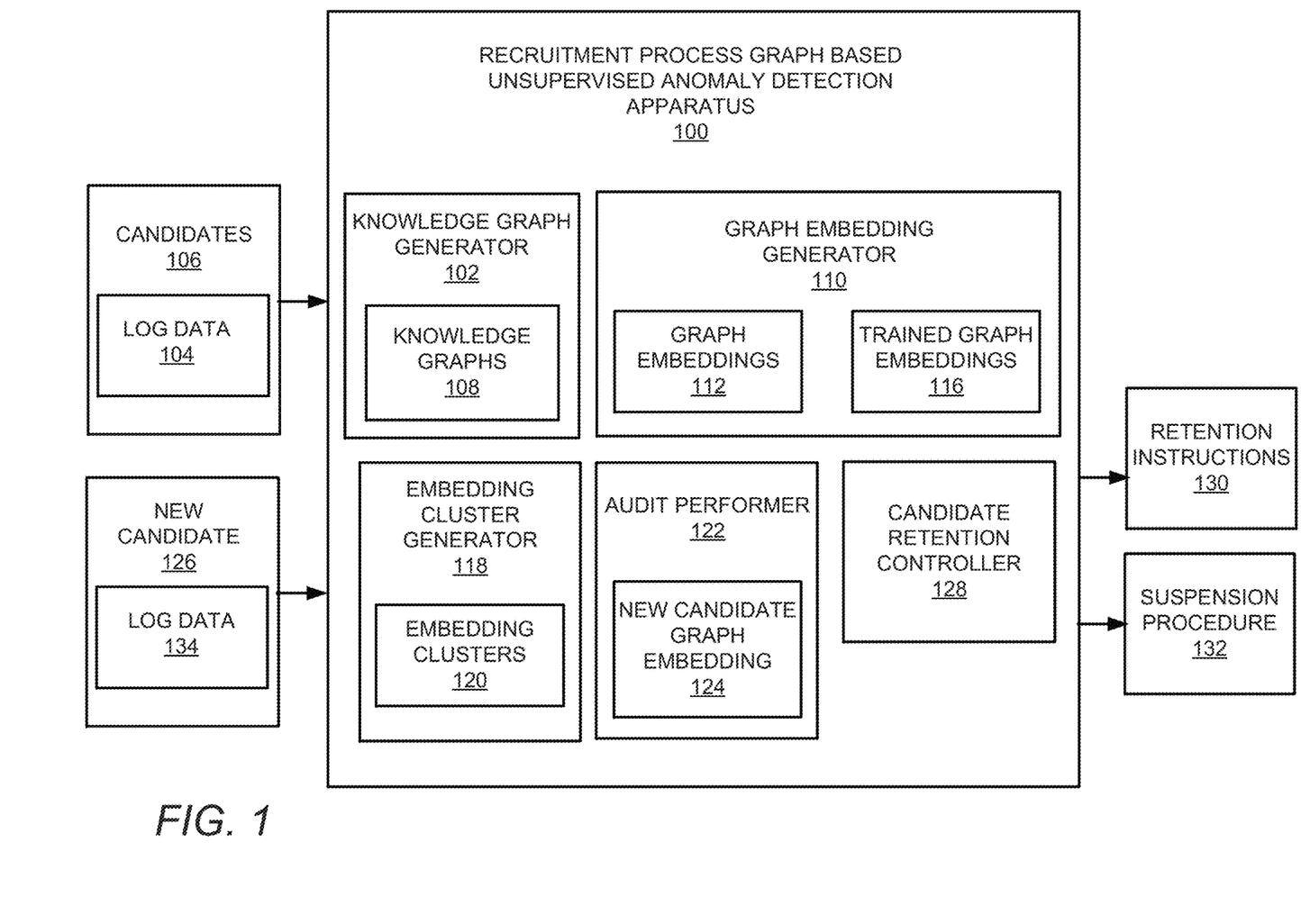
FIG. 1 illustrates a layout of a recruitment process graph based unsupervised anomaly detection apparatus in accordance with an example of the present disclosure.

FIG. 1 illustrates a layout of an example recruitment process graph based unsupervised anomaly detection apparatus (hereinafter also referred to as "apparatus 100").

Referring to FIG. 1, the apparatus 100 may include a knowledge graph generator 102 that is executed by at least one hardware processor (e.g., the hardware processor 502 of FIG. 5, and/or the hardware processor 704 of FIG. 7) to obtain log data 104 associated with at least one recruitment process for a plurality of candidates 106 for at least one organization.

The knowledge graph generator 102 may generate a plurality of knowledge graphs 108 by analyzing the log data 104, and generating, for each candidate of the plurality of candidates 106, a knowledge graph that includes entities associated with the at least one recruitment process and relations between the entities.

According to examples disclosed herein, the knowledge graph generator 102 may extrapolate, based on a set of rules, the entities associated with the at least one recruitment process and the relations between the entities.

A graph embedding generator 110 that is executed by at least one hardware processor (e.g., the hardware processor 502 of FIG. 5, and/or the hardware processor 704 of FIG. 7) may generate a plurality of graph embeddings 112 by generating, for each knowledge graph of the plurality of knowledge graphs 108, a graph embedding.

According to examples disclosed herein, the graph embedding generator 110 may generate the plurality of graph embeddings 112 by generating, for each knowledge graph of the plurality of knowledge graphs 108, the graph embedding by converting, for each knowledge graph of the plurality of knowledge graphs 108, the log data 104 into an n-dimensional vector.

The graph embedding generator 110 may train the plurality of graph embeddings 112 on a first property that graph embeddings of genuine candidate hires are relatively close in vector space, a second property that graph embeddings of fraudulent candidate hires are relatively close in the vector space, and a third property that the graph embeddings of the genuine candidate hires are relatively far apart in the vector space from the graph embeddings of the fraudulent candidate hires. The plurality of graph embeddings 112 that are trained may be designated as trained graph embeddings 116. The graph structure and the training, while generating the graph embeddings 112, may be implicitly implemented to ensure that the aforementioned properties are observed in the trained graph embeddings 116.

An embedding cluster generator 118 that is executed by at least one hardware processor (e.g., the hardware processor 502 of FIG. 5, and/or the hardware processor 704 of FIG. 7) may cluster the trained graph embeddings 116 to generate a plurality of embedding clusters 120 that include at least one genuine candidate cluster, and at least one fraudulent candidate cluster.

An audit performer 122 that is executed by at least one hardware processor (e.g., the hardware processor 502 of FIG. 5, and/or the hardware processor 704 of FIG. 7) may receive a new candidate graph embedding 124 for a new candidate 126, and determine whether the new candidate graph embedding 124 belongs to the at least one genuine candidate cluster or to the at least one fraudulent candidate cluster.

In this regard, according to examples disclosed herein, the knowledge graph generator 102 may generate a new candidate knowledge graph (e.g., in the same manner as the knowledge graphs 108) from log data 134 associated with another recruitment process for the new candidate 126. Further, the graph embedding generator 110 may generate, from the new candidate knowledge graph, the new candidate graph embedding 124.

According to examples disclosed herein, the audit performer 122 may determine whether the new candidate graph embedding 124 belongs to a further cluster that represents an unknown anomaly cluster.

A candidate retention controller 128 that is executed by at least one hardware processor (e.g., the hardware processor 502 of FIG. 5, and/or the hardware processor 704 of FIG. 7) may generate, based on a determination that the new candidate graph embedding 124 belongs to the at least one genuine candidate cluster, instructions 130 (e.g., retention instructions 130) to retain the new candidate, and implement, based on a determination that the new candidate graph embedding 124 belongs to the at least one fraudulent candidate cluster, a procedure 132 (e.g., suspension procedure 132) to suspend the new candidate 126.

According to examples disclosed herein, the candidate retention controller 128 may generate, based on a determination that the new candidate graph embedding 124 belongs to the unknown anomaly cluster, instructions to perform a further investigation on the new candidate 126.

Operation of the apparatus 100 is described in further detail with reference to FIGS. 2-4B.

Figure 2:
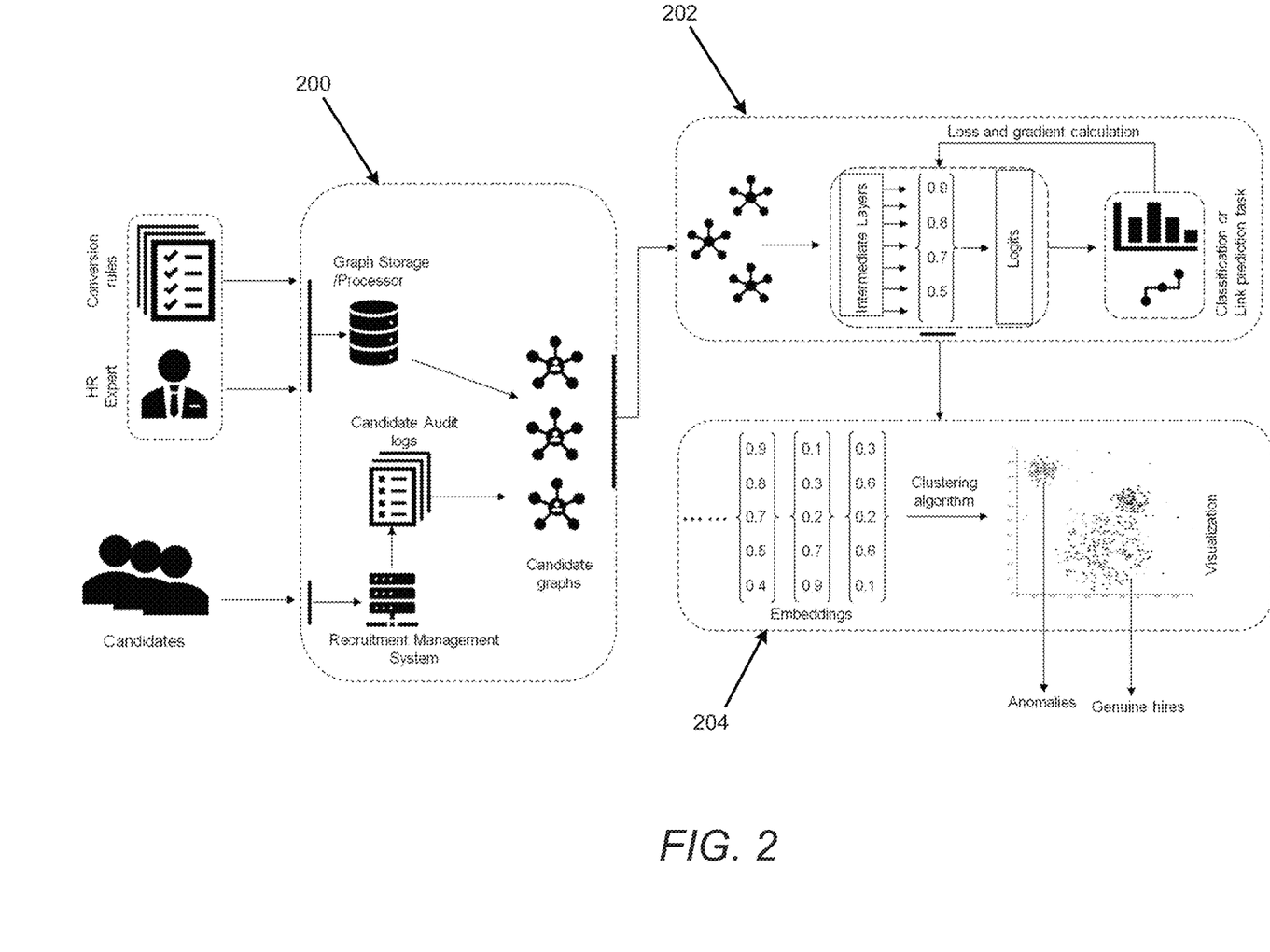
FIG. 2 illustrates an example of an architecture of the recruitment process graph based unsupervised anomaly detection apparatus of FIG. 1 in accordance with an example of the present disclosure.

FIG. 2 illustrates an example of an architecture of the apparatus 100 in accordance with an example of the present disclosure.

Referring to FIG. 2, at 200, the knowledge graph generator 102 may generate a plurality of knowledge graphs 108 by analyzing the log data 104, and generating, for each candidate of the plurality of candidates 106, a knowledge graph that includes entities associated with the at least one recruitment process and relations between the entities.

At 202, the graph embedding generator 110 may generate a plurality of graph embeddings 112 by generating, for each knowledge graph of the plurality of knowledge graphs 108, a graph embedding.

At 204, the embedding cluster generator 118 may cluster the trained graph embeddings 116 to generate a plurality of embedding clusters 120 that include at least one genuine candidate cluster, and at least one fraudulent candidate cluster.

Figure 3:
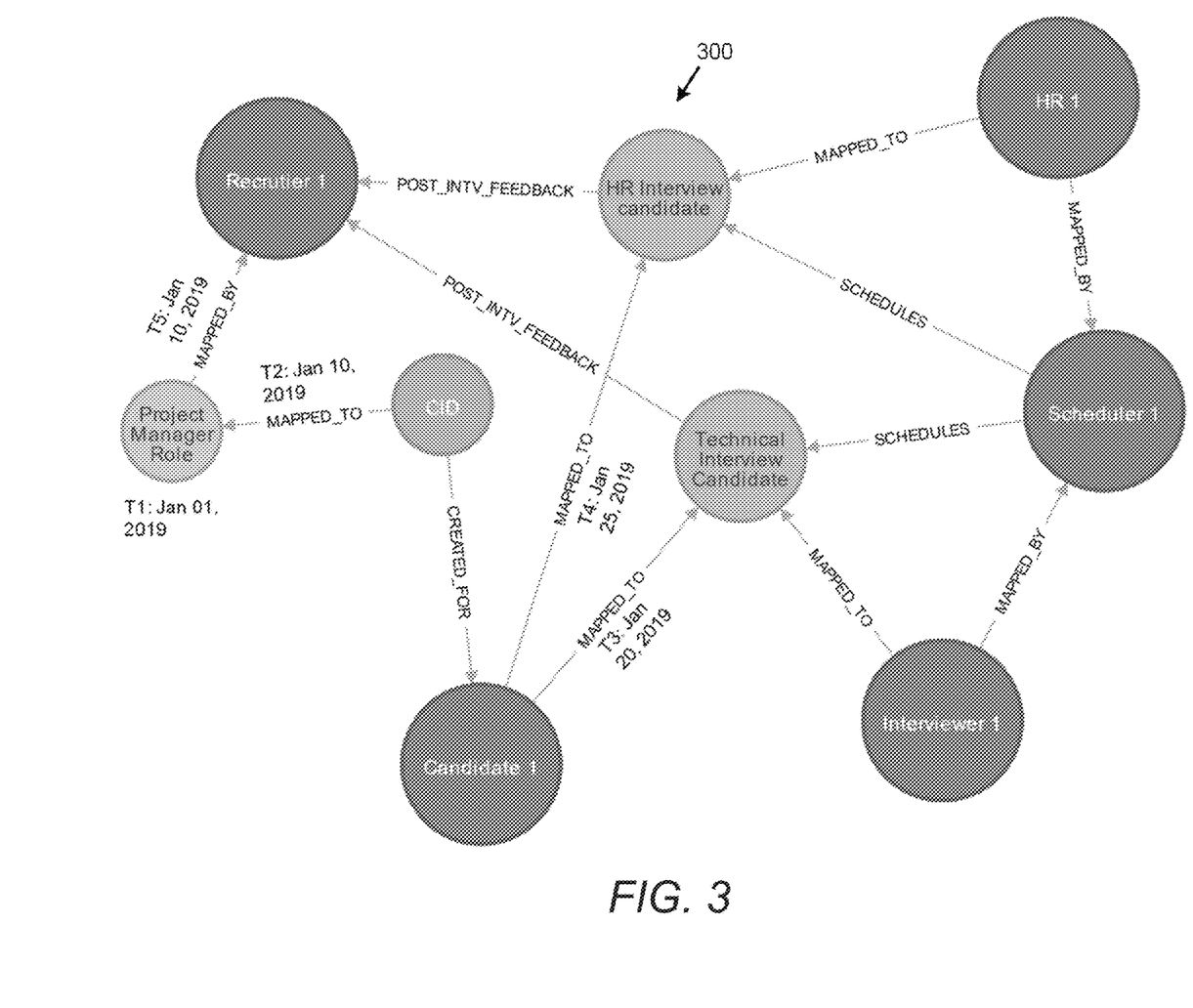
FIG. 3 illustrates a recruitment scenario to illustrate operation of the recruitment process graph based unsupervised anomaly detection apparatus of FIG. 1 in accordance with an example of the present disclosure.

FIG. 3 illustrates a recruitment scenario 300 to illustrate operation of the apparatus 100 in accordance with an example of the present disclosure.

Referring to FIG. 3, for the knowledge graph illustrated, the recruitment flow 300 may include information related to person, interview, demand, document, teams, tool, and identification number. The circles may represent entities of the knowledge graph, and the arrows may represent relations between the entities. For the recruitment scenario 300, time T1 (e.g., Jan. 1, 2019) is less than T2 (e.g., Jan. 10, 2019), which is less than T3 (e.g., Jan. 20, 2019), and which is less than T4 (e.g., Jan. 25, 2019).

With respect to an inconsistency, ideally the service request (SR) should be created first before any interview or screening. In this regard, a fraudulent scenario may include where interviews are conducted before a service request is created. Possible outcomes may include where an interviewer, scheduler and/or human resources may be colluding.

According to another example of an inconsistency, an interview may be conducted but not assigned to any demand. In this regard, a fraudulent scenario may represent where an interviewer keeps a pool of interviewed candidates. The audit performer 122 may detect irregularities based on isolated demand nodes that may be detected, and not tagged to any candidate ID's. The audit performer 122 may determine if the new candidate graph embedding 124 or log data 134 belongs to a cluster of this particular inconsistency or fraud.

According to examples disclosed herein, an inconsistency may be detected by a process that may be built, for example, with Neo4j software, and may utilize a language such as Cypher, or Python. The inconsistency detection process may be based on machine learning or deep-learning based techniques.

With respect to graph embeddings for process graphs, generation of whole graph embeddings may include convolution neural networks for graphs, hierarchical graph embedding structures, and graph kernels. With respect to hierarchical graph embedding structures, each level may be a summarized graph at different scale, and all levels may then be concatenated. Hybrid graph embeddings may include node and edge embeddings. Further, custom techniques may include a need to incorporate annotated labels in an objective function to converge different graphs to a same representation. These techniques may be utilized to generate graph embeddings.

As disclosed herein, the graph embedding generator 110 may generate a plurality of graph embeddings 112 by generating, for each knowledge graph of the plurality of knowledge graphs 108, a graph embedding. Further, the graph embedding generator 110 may train the plurality of graph embeddings 112 on a first property that graph embeddings of genuine candidate hires are relatively close in vector space, a second property that graph embeddings of fraudulent candidate hires are relatively close in the vector space, and a third property that the graph embeddings of the genuine candidate hires are relatively far apart in the vector space from the graph embeddings of the fraudulent candidate hires. With respect to generation and training of the plurality of graph embeddings 112, in a first step, the graph embedding generator 110 may generate embeddings for entities and relations present in the knowledge graph (that would be generated by the knowledge graph generator 108). The second step may include combining the embeddings of entities and relations of each knowledge graph in a specific way. The final output from the second step may include a single n-dimensional vector for the entire knowledge graph.

With respect to the first step above, a deep-learning model or neural network may be utilized. In this particular case, the neural network or the model may input the knowledge graph in some format and provide with some output. The body of the network/model may be comprised of weights and parameters, which would try to learn the optimal values for the task.

An objective of the network/model may include generating and learning meaningful representations (e.g., vectors) for the entities and relations. In order to perform this task, an objective function and loss for the entire network/model may be specified. Given the input data, the model/network weights or parameters may be updated in such a way that the value of the function or loss is minimized. The model may iterate through the entire data multiple times, and the model weights may be updated and modified. The weights and parameters may be pushed towards optimal values in this entire process.

In order to input the knowledge graph into the model, the knowledge graph "G" may be converted into a set of triples. The triples may be of form (entity, relation, entity). Each entity may be represented as an n-dimensional vector, and may be randomly initialized with real values before the training begins. The relations may be represented in different ways. One such way is shown below, where it is represented as a pair of 2 d×d dimensional matrix of real values.

In order to capture the semantic meaning of the relations, a scoring function may be defined. The scoring function may define the relationship between different types of entities, in a quantitative manner. The scoring function may be defined in many ways and some of the formulations are discussed below.

The scoring function may then be used to formulate the objective function/loss for the network. The objective may now become to minimize the value of objective loss over all of the input and training data (in this case the set of knowledge graphs). The model/network's weights may be updated based on the objective function/loss value.

The scoring function may thus denote a similarity measure which captures or defines the relationship between entities. The scoring function may provide for representation of relations (edges) within a knowledge graph. The objective of the model/network is to minimize the objective loss on given input data. The loss or function may be constructed is such a way that the model weights/parameters would be able to generalize well over the training/input data. During the training phase, the model weights/parameters may be updated iteratively according to objective loss value in that particular iteration. In this case as well, a neural network may be utilized to train and generate embeddings, with the objective function/loss being defined accordingly. The objective would be to minimize the loss and, in the process, generate meaningful and relevant embeddings for entities and relations of the knowledge graph. The objective function may utilize the scoring function to capture the semantic meaning of the relations and entities and embed them in n-dimensional vectors.

As the training progresses, the model may be iterated through the entire input data multiple times and the model/network may learn the optimal values for its weights/parameters. Once the objective loss value plateaus over many iterations, training may be stopped.

The embeddings learned for entities and relations may then be utilized for the second step mentioned above.

The processes described above with reference to the first and second steps are described in further detail. Specifically, as discussed above, with respect to graph embeddings for the knowledge graph deep learning perspective, below is an example process, which may be used to generate a singular embedding for the entire graph. As discussed above, the first step may include a training phase in which entities and relation embeddings are generated. Similarly, as discussed above, for the second step, the entity and relation embeddings of a graph may be combined using non-linear functions or other operators. The first step may be implemented as follows:

Let graph G be a set of triples which is a subset of all possible triples as follows:

$$\text{Graph } G=\{(e^l,r,e^r)\}\subseteq E\times R\times E \; \forall e\in E, r\in R$$

For the equation above, the notations $\forall e\in E$, $r\in R$ mean that an entity belonging to a set of all entities, and a relation belonging to a set of all relations.

E: entities(nodes in graph), R: relations(edges in graph)
For the equation above, e represents a single entity from the set of entities, l means left, and r means right.

$$(e^l) \xrightarrow{r} (e^r)$$

Random initialization of Entity and Relation embeddings may be implemented as follows:

$$E_k = \begin{bmatrix} 0.1 \\ \vdots \\ 0.5 \end{bmatrix}, E_k \in \mathbb{R}^d \quad R_k = (R_k^{lhs}, R_k^{rhs}), \text{ where } R^{lhs}, R^{rhs} \in \mathbb{R}^{d\times d} \text{ or}$$

$$R_k = r_k; r_k \in \mathbb{R}^d$$

The $k^{th}$ entity $E_k$ may be modeled as a d-dimensional vector. The $k^{th}$ relation type $R_k$ may be represented as either a pair of two d×d dimensional matrices or a d-dimensional vector.

A scoring or similarity function may be defined to capture the relation or correspondence between two entities in a graph. This function may be integrated in the objective function or loss of the neural network. The scoring function may be specified as follows:

$$\psi_k(e^l, e^r) = \begin{cases} \|W_k^L e^l - W_k^R e^r\|_p & , p-\text{norm where } p=1 \\ \langle e^l, k, e^r \rangle & , \text{inner dot product} \\ f(vec(f([\overline{e}^l, \overline{k}]*\omega))W)e^r & , 2-D \text{ convolution } op \end{cases}$$

For the scoring function, $W_k^L, W_k^R \in \mathbb{R}^{k\times k}$; $e^l, e^r \in \mathbb{R}^d$; f: ReLU (Rectified Linear Unit) or another non-linear function. For the equation above, r,R means right, L means left, and p-norm is a mathematical operation.

ω: No. of filters in 2D convolution layer

Linear Transformation matrix $W \in \mathbb{R}^{cmn\times k}$ $W_k^L$, $W_k^R$ may correspond to the relation pair $R_k$. In this regard, $e^l$, $e^r$ may represent the embedding vectors of the entities.

The objective loss may be specified as follows:

$$L = \phi(\psi_k(e^l, e^r)) = \begin{cases} \max(0, 1 - f(x^{neg}) + f(x)) \\ \vdots \\ -\frac{1}{N}\sum_k (t_i \cdot \log(p_i) + (1 - t_i) \cdot \log(1 - p_i)), \text{ where } p = \sigma(\psi_k(e^l, e^r)) \end{cases}$$

For the equation above, $x_{neg}$=
($e^{neg}$, k, $e^r$) or ($e^l$, k, $e^{neg}$), $x^{neg}$ represents a negative triplet $e^{neg} \in E$ such that $x^{neg}$ exists, $x^{neg}$ represents a triplet which doesn't exist in graph, and
x represents a positive triplet (exits in graph). Further,
$\phi$ is a notation for a function such as f(x), $\psi_k$ is the scoring function of $k^{th}$ relation type $R_k$
N: total no of relation types in graph, $t_i \in \mathbb{R}^{1 \times N}$ (vector whose elements are 1 if relation type exist otherwise 0)
A neural network may be trained using the aforementioned objective losses and other components to derive meaningful and relevant embeddings for entities and relations.

The second step (e.g., where the entity and relation embeddings of a graph may be combined using non-linear functions or other operators) may be implemented as follows. Once embeddings are generated for entities and relations, they may be synthesized to generate a single embedding for the entire graph as follows:

$$\mathcal{G}_{process} = \{(e_{process}^l, r_k, e_{process}^r) : e \in E, r \in R\}, \text{ where}$$

$\mathcal{G}_{process}$ graph of processed candidate.

The second step may utilize one of the below algorithms to generate embeddings for the entire knowledge graph. Each algorithm may combine the embeddings, of the entities and relations present in the knowledge graph, in a unique and different way into a single vector. An example of a first algorithm may include:
$F_k = [\ ]$
for each ($e^l$, r, $e^r$) in $\mathcal{G}_k$:
    dot_product=$\langle e^l, r, e^r \rangle \rightarrow \langle x, y, z \rangle = \Sigma_i x_i y_i z_i$
    $F_k$=concat($F_k$, dot_product)
$F_k$: Final embedding for graph $\mathcal{G}_k$; $F_k \in \mathbb{R}^d$
For the equations above, x, y, and z may be utilized to show how the term $\langle e^l, r, e^r \rangle$ is determined, and may represent an inner dot product.

An example of a second algorithm may include:

RNN(Recurrent Neural Network): $h_t = g(Wx_t + Uh_{t-1})$;
    $h_t \in \mathbb{R}^d$; g(x):non-linear function (e.g. tanh)

for each ($e^l$, r, $e^r$) in $\mathcal{G}_k$(time sorted):

$F_k$=concat[$e^l, r, e^r$]

$h_t = g(WF_k + Uh_{t-1})$ $h_{t-1} = h_t$ $h_t$: Final embedding for graph $\mathcal{G}_k$, $h_t \in \mathbb{R}^d$
For the equations above, g, U, and t may represent the internal functions and weights/parameters of the recurrent neural network (RNN), which may represent a deep-learning model used for modeling sequences.

The embedding cluster generator 118 may cluster the trained graph embeddings 116 to generate a plurality of embedding clusters 120 that include at least one genuine candidate cluster, and at least one fraudulent candidate cluster. In this regard, with respect to unsupervised learning for detecting anomalies, examples of clustering techniques for clustering low and high dimensional data may include K-means, agglomerative clustering, etc., and examples of clustering techniques for graph embeddings may include deep clustering by Gaussian mixture variational autoencoders, multi-view clustering, etc.

Figure 4A:
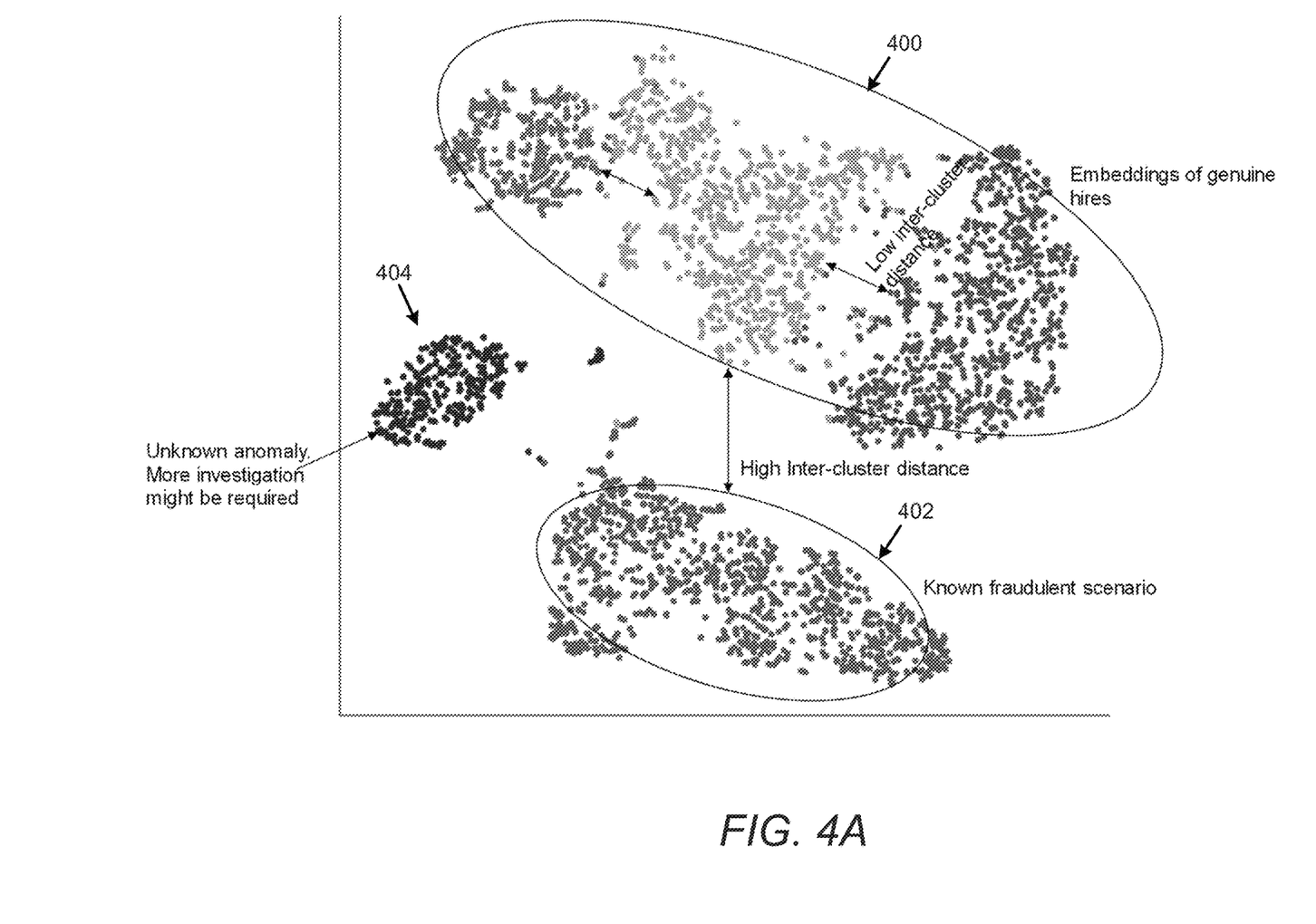
FIG. 4A illustrates embedding clustering to illustrate operation of the recruitment process graph based unsupervised anomaly detection apparatus of FIG. 1 in accordance with an example of the present disclosure.

FIG. 4A illustrates embedding clustering to illustrate operation of the apparatus 100 in accordance with an example of the present disclosure.

As disclosed herein, the embedding cluster generator 118 may cluster the trained graph embeddings 116 to generate a plurality of embedding clusters 120 that include at least one genuine candidate cluster, and at least one fraudulent candidate cluster. Referring to FIG. 4A, embeddings of genuine hires (e.g., the genuine candidate cluster) are shown at 400, and may include a low inter-cluster distance within genuine hire clusters. Embeddings of a known fraudulent scenario (e.g., the fraudulent candidate cluster) are shown at 402 and may include a high inter-cluster distance from genuine hire clusters. Similarly, for an unknown anomaly cluster shown at 404, further investigation may be needed. In this regard, the audit performer 122 may determine whether the new candidate graph embedding 124 belongs to a further cluster that represents an unknown anomaly cluster (e.g., at 404).

As disclosed herein, the candidate retention controller 128 may generate, based on a determination that the new candidate graph embedding 124 belongs to the at least one genuine candidate cluster, instructions 130 (e.g., retention instructions 130) to retain the new candidate, and implement, based on a determination that the new candidate graph embedding 124 belongs to the at least one fraudulent candidate cluster, a procedure 132 (e.g., suspension procedure 132) to suspend the new candidate 126. In this regard, if the new candidate graph embedding 124 belongs to the at least one fraudulent candidate cluster, a temporary suspension order may be triggered for the new candidate 126 whose log data was categorized as an anomaly or fraudulent hire. The candidate retention controller 128 may generate instructions to suspend the new candidate's access to all active projects until further investigation. An escalation matrix may be setup for such scenarios and necessary alerts may be sent to appropriate personnel and/or the new candidate's manager/team lead. The appropriate personnel may investigate, and an online form may be sent (e.g., automated by application) to the new candidate 126 exacting his/her account of the recruitment process. Another tool within the candidate retention controller 128 may bring up the new candidate's process graph (e.g., knowledge graph), after being requested by the appropriate personnel, for further investigation of employees/personnel involved in this anomalous process. The tool may probe further into the new candidate's previous records, and along with the investigation, a determination may be made as to whether the other employee(s)/personnel are in violation of organization policies. If so, the other employee(s)/personnel may be penalized (e.g., suspension, termination etc.) appropriately.

Figure 4B:
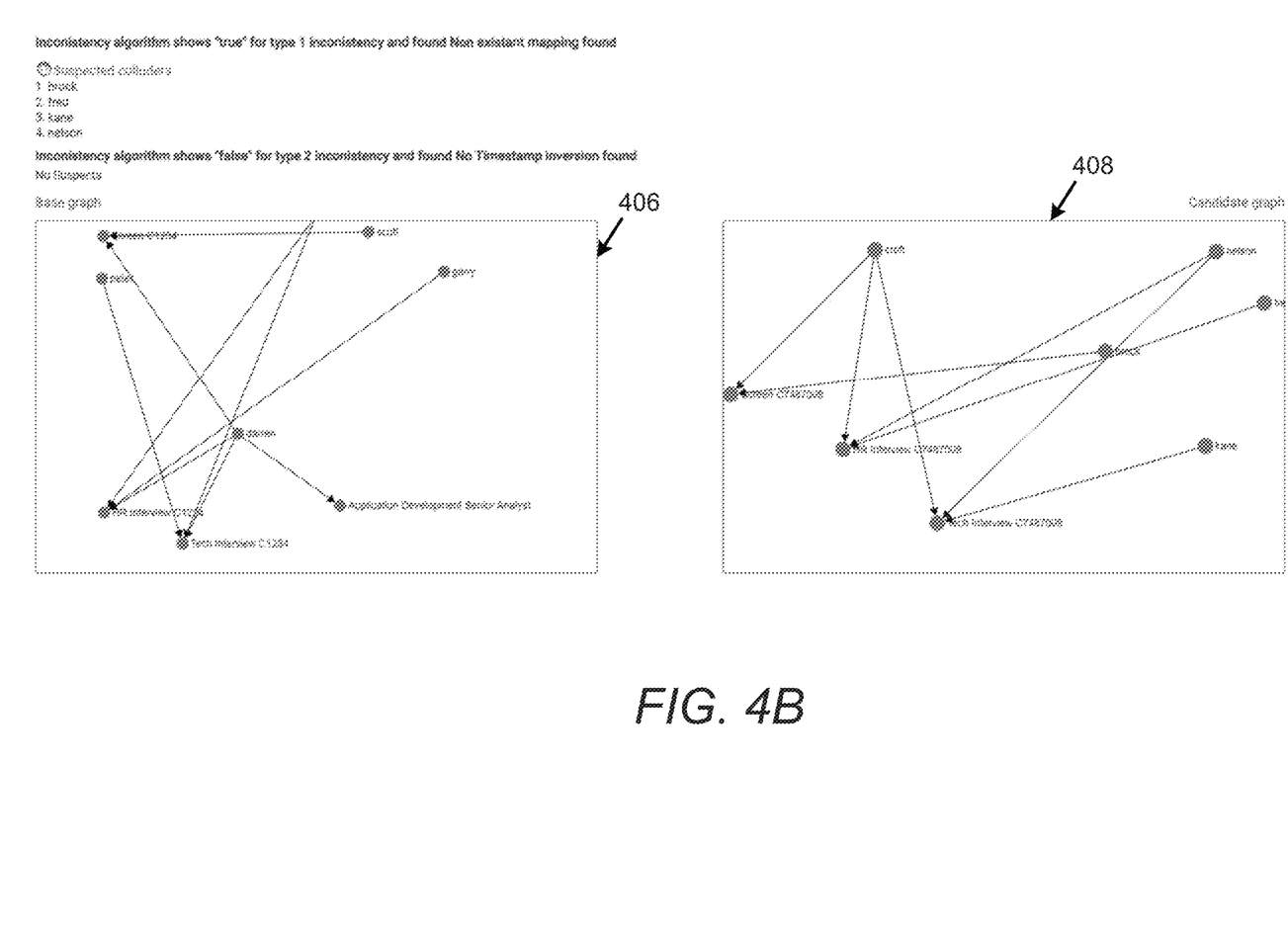
FIG. 4B illustrates operation of a candidate retention controller based on an embedding disposed in a fraudulent candidate cluster of FIG. 4A to illustrate operation of the recruitment process graph based unsupervised anomaly detection apparatus of FIG. 1 in accordance with an example of the present disclosure.

FIG. 4B illustrates operation of the candidate retention controller 128 based on an embedding disposed in a fraudulent candidate cluster (e.g., at 402) of FIG. 4A to illustrate operation of the apparatus 100 in accordance with an example of the present disclosure.

Referring to FIG. 4B, for a base knowledge graph shown at 406, a candidate knowledge graph may be shown at 408. The base knowledge graph may represent a sample of a genuine candidate hire graph, where all rules and procedures are followed. The candidate knowledge graph may represent a fraudulent/anomalous log/graph in question. These two knowledge graphs are shown for visualization purposes, so that the appropriate personnel/auditor can see the differences between the two knowledge graphs. The candidate knowledge graph also serves another purpose in that once the candidate's log is flagged as fraudulent or anomalous, the knowledge graph may be extracted back to determine the potential colluders. In this regard, different types of frauds such as Type 1 and Type 2 may be detected. For example, for a new candidate knowledge graph, the embedding may belong to a fraud cluster of either "Type 1" or "Type 2" inconsistency. In this regard, the output may be displayed, for example, as "true" against the type of inconsistency and names of potential colluders.

Figure 5:
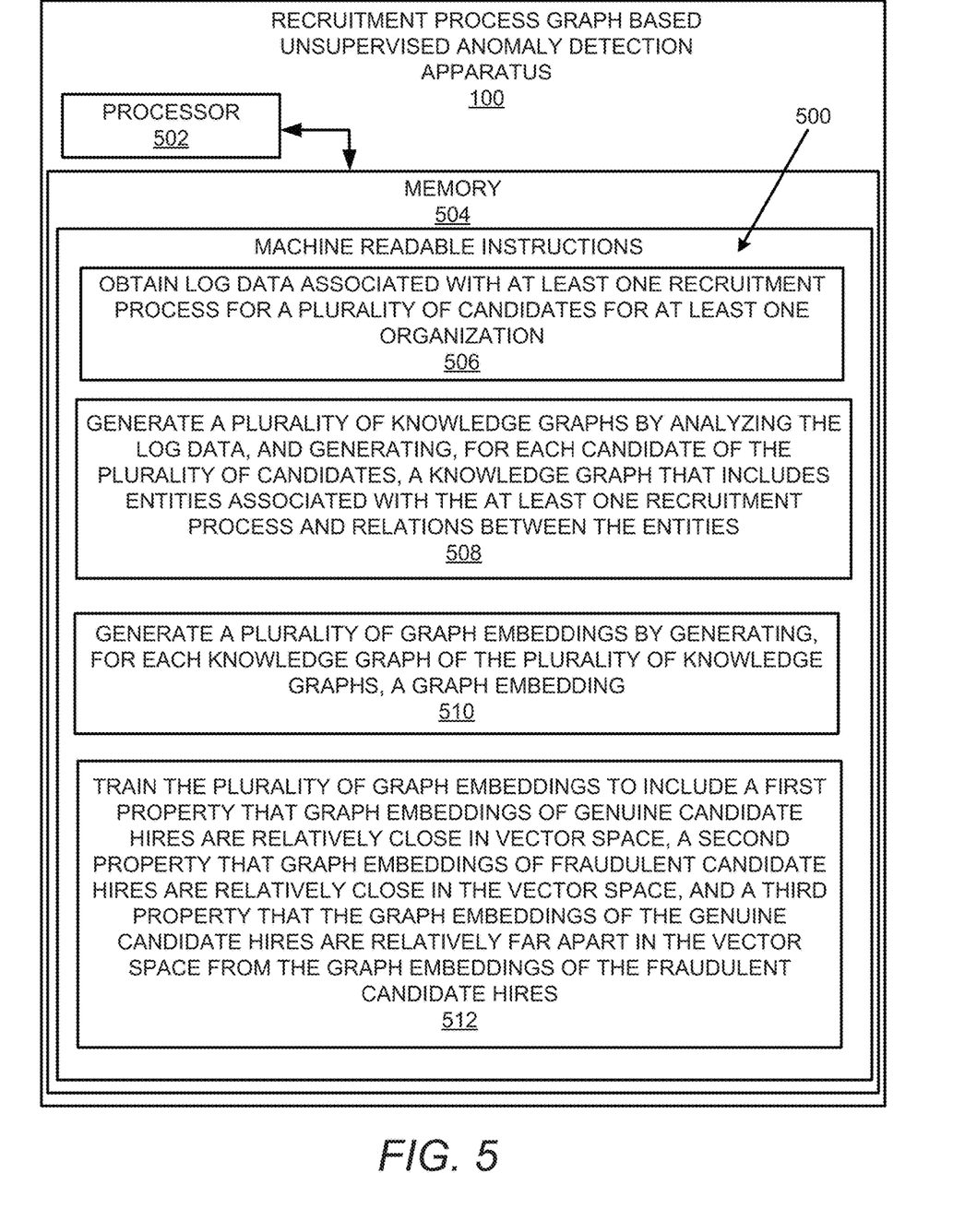
FIG. 5 illustrates an example block diagram for recruitment process graph based unsupervised anomaly detection in accordance with an example of the present disclosure.
Figure 6:
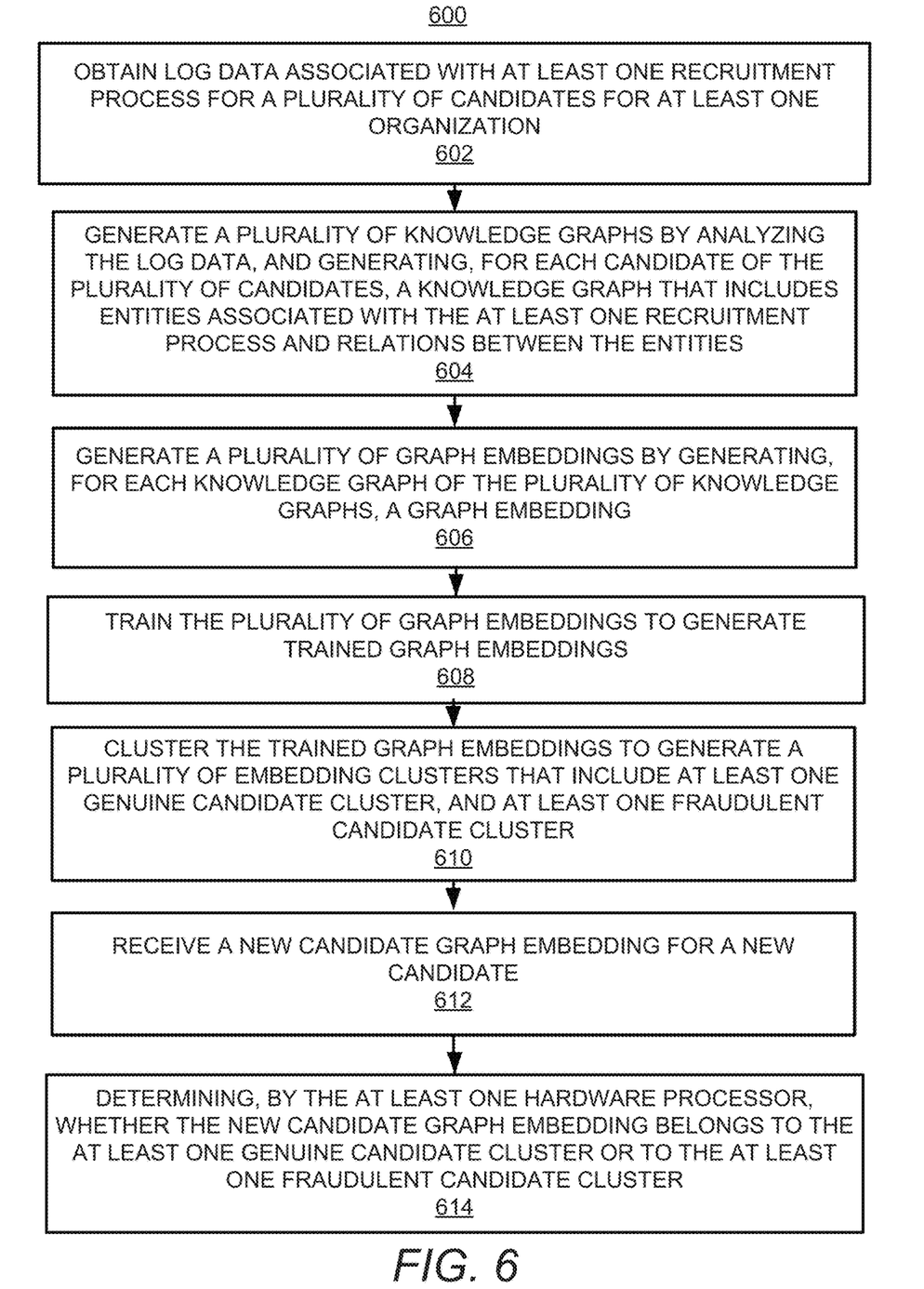
FIG. 6 illustrates a flowchart of an example method for recruitment process graph based unsupervised anomaly detection in accordance with an example of the present disclosure.
Figure 7:
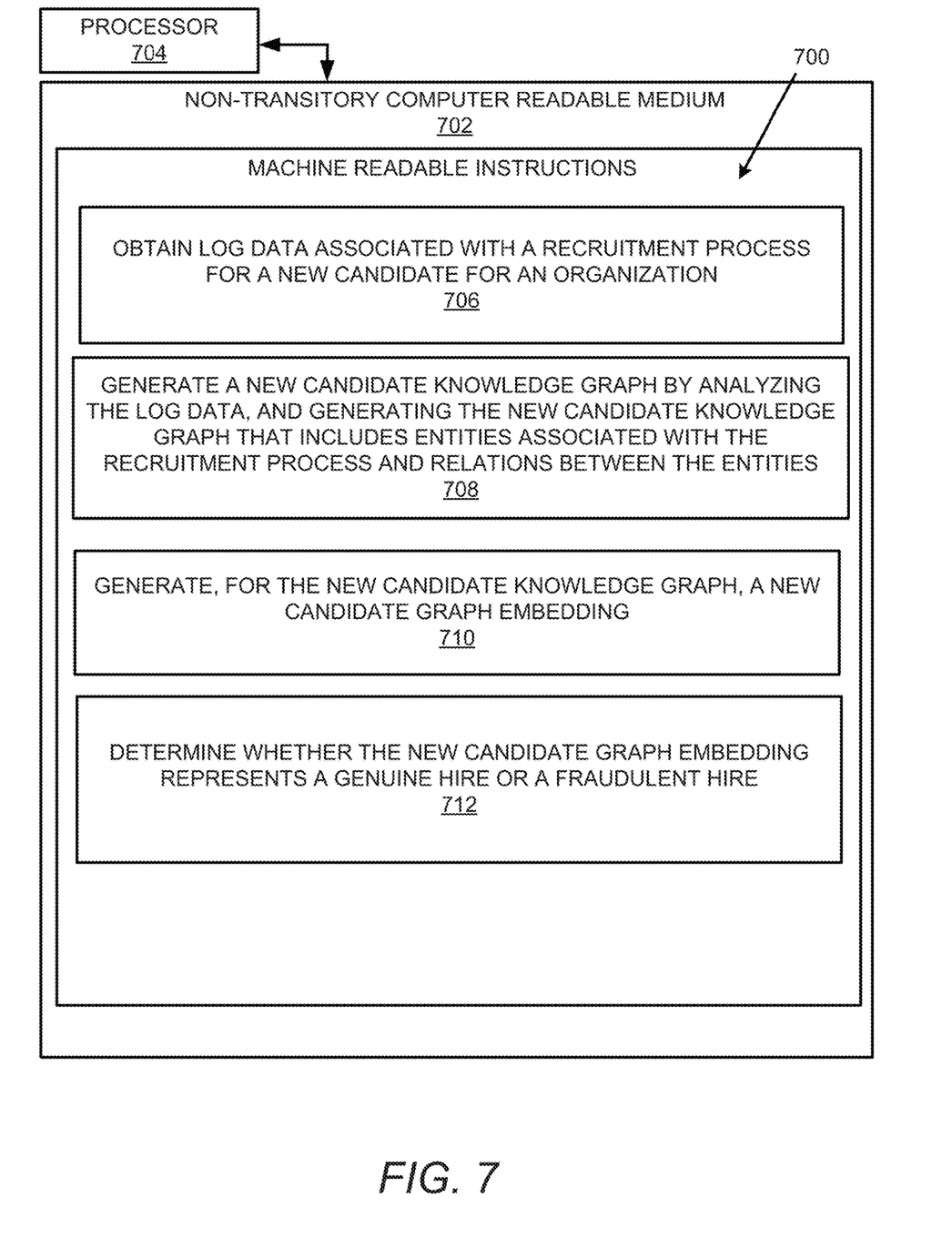
FIG. 7 illustrates a further example block diagram for recruitment process graph based unsupervised anomaly detection in accordance with another example of the present disclosure.

FIGS. 5-7 respectively illustrate an example block diagram 500, a flowchart of an example method 600, and a further example block diagram 700 for recruitment process graph based unsupervised anomaly detection, according to examples. The block diagram 500, the method 600, and the block diagram 700 may be implemented on the apparatus 100 described above with reference to FIG. 1 by way of example and not of limitation. The block diagram 500, the method 600, and the block diagram 700 may be practiced in other apparatus. In addition to showing the block diagram 500, FIG. 5 shows hardware of the apparatus 100 that may execute the instructions of the block diagram 500. The hardware may include a processor 502, and a memory 504 storing machine readable instructions that when executed by the processor cause the processor to perform the instructions of the block diagram 500. The memory 504 may represent a non-transitory computer readable medium. FIG. 6 may represent an example method for recruitment process graph based unsupervised anomaly detection, and the steps of the method. FIG. 7 may represent a non-transitory computer readable medium 702 having stored thereon machine readable instructions to provide recruitment process graph based unsupervised anomaly detection according to an example. The machine readable instructions, when executed, cause a processor 704 to perform the instructions of the block diagram 700 also shown in FIG. 7.

The processor 502 of FIG. 5 and/or the processor 704 of FIG. 7 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 702 of FIG. 7), such as hardware storage devices (e.g., RAM (random access memory), ROM (read only memory), EPROM (erasable, programmable ROM), EEPROM (electrically erasable, programmable ROM), hard drives, and flash memory). The memory 504 may include a RAM, where the machine readable instructions and data for a processor may reside during runtime.

Referring to FIGS. 1-5, and particularly to the block diagram 500 shown in FIG. 5, the memory 504 may include instructions 506 to obtain log data 104 associated with at least one recruitment process for a plurality of candidates 106 for at least one organization.

The processor 502 may fetch, decode, and execute the instructions 508 to generate a plurality of knowledge graphs 108 by analyzing the log data 104, and generating, for each candidate of the plurality of candidates 106, a knowledge graph that includes entities associated with the at least one recruitment process and relations between the entities.

The processor 502 may fetch, decode, and execute the instructions 510 to generate a plurality of graph embeddings 112 by generating, for each knowledge graph of the plurality of knowledge graphs 108, a graph embedding.

The processor 502 may fetch, decode, and execute the instructions 512 to train the plurality of graph embeddings 112 to include a first property that graph embeddings of genuine candidate hires are relatively close in vector space, a second property that graph embeddings of fraudulent candidate hires are relatively close in the vector space, and a third property that the graph embeddings of the genuine candidate hires are relatively far apart in the vector space from the graph embeddings of the fraudulent candidate hires.

The processor 502 may fetch, decode, and execute the instructions 514 to cluster the trained graph embeddings 116 to generate a plurality of embedding clusters 120 that include at least one genuine candidate cluster, and at least one fraudulent candidate cluster.

The processor 502 may fetch, decode, and execute the instructions 516 to receive a new candidate graph embedding 124 for a new candidate 126.

The processor 502 may fetch, decode, and execute the instructions 518 to determine whether the new candidate graph embedding 124 belongs to the at least one genuine candidate cluster or to the at least one fraudulent candidate cluster or any other anomalous cluster.

The processor 502 may fetch, decode, and execute the instructions 520 to generate, based on a determination that the new candidate graph embedding 124 belongs to the at least one genuine candidate cluster, instructions 130 (e.g., retention instructions 130) to retain the new candidate.

The processor 502 may fetch, decode, and execute the instructions 522 to implement, based on a determination that the new candidate graph embedding 124 belongs to the at least one fraudulent candidate cluster, a procedure 132 (e.g., suspension procedure 132) to suspend the new candidate 126.

Referring to FIGS. 1-4 and 6, and particularly FIG. 6, for the method 600, at block 602, the method may include obtaining log data associated with at least one recruitment process for a plurality of candidates for at least one organization.

At block 604, the method may include generating a plurality of knowledge graphs by analyzing the log data, and generating, for each candidate of the plurality of candidates, a knowledge graph that includes entities associated with the at least one recruitment process and relations between the entities.

At block 606, the method may include generating a plurality of graph embeddings by generating, for each knowledge graph of the plurality of knowledge graphs, a graph embedding.

At block 608, the method may include training the plurality of graph embeddings to generate trained graph embeddings.

At block 610, the method may include clustering the trained graph embeddings to generate a plurality of embedding clusters that include at least one genuine candidate cluster, and at least one fraudulent candidate cluster.

At block 612, the method may include receiving a new candidate graph embedding for a new candidate.

At block 614, the method may include determining whether the new candidate graph embedding belongs to the at least one genuine candidate cluster or to the at least one fraudulent candidate cluster or a separate anomalous cluster.

Referring to FIGS. 1-4 and 7, and particularly FIG. 7, for the block diagram 700, the non-transitory computer readable medium 702 may include instructions 706 to obtain log data associated with a recruitment process for a new candidate for an organization.

The processor 704 may fetch, decode, and execute the instructions 708 to generate a new candidate knowledge graph by analyzing the log data, and generating the new candidate knowledge graph that includes entities associated with the recruitment process and relations between the entities.

The processor 704 may fetch, decode, and execute the instructions 710 to generate, for the new candidate knowledge graph, a new candidate graph embedding.

The processor 704 may fetch, decode, and execute the instructions 712 to determine whether the new candidate graph embedding represents a genuine hire or a fraudulent hire.

According to examples disclosed herein, the processor 704 may fetch, decode, and execute the instructions to determine whether the new candidate graph embedding belongs to at least one genuine candidate cluster that represents the genuine hire or to at least one fraudulent candidate cluster that represents the fraudulent hire.

According to examples disclosed herein, the processor 704 may fetch, decode, and execute the instructions to obtain further log data associated with at least one recruitment process for a plurality of candidates, and generate a plurality of knowledge graphs by analyzing the further log data, and generating, for each candidate of the plurality of candidates, a knowledge graph. The processor 704 may fetch, decode, and execute the instructions to generate a plurality of graph embeddings by generating, for each knowledge graph of the plurality of knowledge graphs, a graph embedding, train the plurality of graph embeddings to generate trained graph embeddings, and cluster the trained graph embeddings to generate a plurality of embedding clusters that include the at least one genuine candidate cluster, and the at least one fraudulent candidate cluster.

According to examples disclosed herein, the processor 704 may fetch, decode, and execute the instructions to extrapolate, based on a set of rules, the entities associated with the recruitment process and the relations between the entities.

According to examples disclosed herein, the processor 704 may fetch, decode, and execute the instructions to convert, for the new candidate knowledge graph, the log data into an n-dimensional vector.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A recruitment process graph based unsupervised anomaly detection apparatus, comprising:
at least one hardware processor;
a knowledge graph generator, executed by the at least one hardware processor, to:
obtain log data associated with at least one recruitment process for a plurality of candidates for at least one organization, and
generate a plurality of knowledge graphs by:
analyzing the log data, and
generating, for each candidate of the plurality of candidates, a knowledge graph that includes entities associated with the at least one recruitment process and relations between the entities;
a graph embedding generator, executed by the at least one hardware processor, to:
generate, by using a neural network, a plurality of graph embeddings by generating, for each knowledge graph of the plurality of knowledge graphs, a graph embedding, and
train the neural network to update the plurality of graph embeddings to include:
a first property that graph embeddings of genuine candidate hires are at a first location in vector space,
a second property that graph embeddings of fraudulent candidate hires are at a second location in the vector space, and
a third property that the first location of the graph embeddings of the genuine candidate hires is different than the second location of the graph embeddings of the fraudulent candidate hires in the vector space,
wherein training the neural network to update the plurality of graph embeddings comprises:
updating embeddings of the relations and the entities of each of the plurality of knowledge graphs by:
generating an objective function of the neural network based on the relations and the entities of each of the plurality of knowledge graphs,
integrating a scoring function with the objective function to capture semantic meaning of the relations and the entities of each of the plurality of knowledge graphs for generating and learning meaningful representations of the relations and the entities, and
updating weights of the neural network to obtain optimal values of the objective function based on the integration of the scoring function with the objective function, wherein the weights of the neural network are updated by multiple iterations through data of the plurality of knowledge graphs; and
generating, by using one or more machine learning algorithms, a single embedding for each knowledge graph of the plurality of knowledge graphs by combining the updated embeddings of the relations and the entities of a respective knowledge graph of the plurality of knowledge graphs in a specific way, wherein the single embedding for each knowledge graph of the plurality of knowledge graphs is generated as a single n-dimensional vector for the respective knowledge graph;
an embedding cluster generator, executed by the at least one hardware processor, to cluster the updated plurality of graph embeddings, based on the single n-dimensional vector, to generate a plurality of embedding clusters that include at least one genuine candidate cluster, and at least one fraudulent candidate cluster;
an audit performer, executed by the at least one hardware processor, to:
receive a new candidate graph embedding for a new candidate, and determine whether the new candidate graph embedding belongs to the at least one genuine candidate cluster or to the at least one fraudulent candidate cluster; and a candidate retention controller, executed by the at least one hardware processor, to:
generate, based on a determination that the new candidate graph embedding belongs to the at least one genuine candidate cluster, instructions to retain the new candidate, and
implement, based on a determination that the new candidate graph embedding belongs to the at least one fraudulent candidate cluster, a procedure to suspend the new candidate.

2. The recruitment process graph based unsupervised anomaly detection apparatus according to claim 1, wherein the knowledge graph generator is executed by the at least one hardware processor to:
extrapolate, based on a set of rules, the entities associated with the at least one recruitment process and the relations between the entities.

3. The recruitment process graph based unsupervised anomaly detection apparatus according to claim 1, wherein the audit performer is executed by the at least one hardware processor to:
determine whether the new candidate graph embedding belongs to a further cluster that represents an unknown anomaly cluster.

4. The recruitment process graph based unsupervised anomaly detection apparatus according to claim 3, wherein the candidate retention controller is executed by the at least one hardware processor to:
generate, based on a determination that the new candidate graph embedding belongs to the unknown anomaly cluster, instructions to perform a further investigation on the new candidate.

5. The recruitment process graph based unsupervised anomaly detection apparatus according to claim 1, wherein:
the knowledge graph generator is executed by the at least one hardware processor to generate a new candidate knowledge graph from log data associated with another recruitment process for the new candidate; and
the graph embedding generator is executed by the at least one hardware processor to generate, from the new candidate knowledge graph, the new candidate graph embedding.

6. A method for recruitment process graph based unsupervised anomaly detection, the method comprising:
obtaining, by at least one hardware processor, log data associated with at least one recruitment process for a plurality of candidates for at least one organization;
generating, by the at least one hardware processor, a plurality of knowledge graphs by:
analyzing the log data, and
generating, for each candidate of the plurality of candidates, a knowledge graph that includes entities associated with the at least one recruitment process and relations between the entities;
generating, by the at least one hardware processor, by using a neural network, a plurality of graph embeddings by generating, for each knowledge graph of the plurality of knowledge graphs, a graph embedding;
training, by the at least one hardware processor, the neural network to update the plurality of graph embeddings to generate updated graph embeddings, wherein training the neural network to update the plurality of graph embeddings comprises:
updating embeddings of the relations and the entities of each of the plurality of knowledge graphs by:
generating an objective function of the neural network based on the relations and the entities of each of the plurality of knowledge graphs,
integrating a scoring function with the objective function to capture semantic meaning of the relations and the entities of each of the plurality of knowledge graphs for generating and learning meaningful representations of the relations and the entities, and
updating weights of the neural network to obtain optimal values of the objective function based on the integration of the scoring function with the objective function, wherein the weights of the neural network are updated by multiple iterations through data of the plurality of knowledge graphs; and
generating, by using one or more machine learning algorithms, a single embedding for each knowledge graph of the plurality of knowledge graphs by combining the updated embeddings of the relations and the entities of a respective knowledge graph of the plurality of knowledge graphs in a specific way, wherein the single embedding for each knowledge graph of the plurality of knowledge graphs is generated as a single n-dimensional vector for the respective knowledge graph;
clustering, by the at least one hardware processor, the updated graph embeddings, based on the single n-dimensional vector, to generate a plurality of embedding clusters that include at least one genuine candidate cluster, and at least one fraudulent candidate cluster;
receiving, by the at least one hardware processor, a new candidate graph embedding for a new candidate; and
determining, by the at least one hardware processor, whether the new candidate graph embedding belongs to the at least one genuine candidate cluster or to the at least one fraudulent candidate cluster.

7. The method according to claim 6, wherein training, by the at least one hardware processor, the neural network to update the plurality of graph embeddings to generate the updated graph embeddings further comprises:
training, by the at least one hardware processor, the neural network to update the plurality of graph embeddings to include:
a first property that graph embeddings of genuine candidate hires are at a first location in vector space,
a second property that graph embeddings of fraudulent candidate hires are at a second location in the vector space, and
a third property that the first location of the graph embeddings of the genuine candidate hires is different than the second location of the graph embeddings of the fraudulent candidate hires in the vector space.

8. The method according to claim 6, further comprising:
generating, by the at least one hardware processor, based on a determination that the new candidate graph embedding belongs to the at least one genuine candidate cluster, instructions to retain the new candidate; and
implementing, by the at least one hardware processor, based on a determination that the new candidate graph embedding belongs to the at least one fraudulent candidate cluster, a procedure to suspend the new candidate.

9. The method according to claim 6, further comprising:
extrapolating, by the at least one hardware processor, based on a set of rules, the entities associated with the at least one recruitment process and the relations between the entities.

10. The method according to claim 6, further comprising:
determining, by the at least one hardware processor, whether the new candidate graph embedding belongs to a further cluster that represents an unknown anomaly cluster; and
generating, based on a determination that the new candidate graph embedding belongs to the unknown anomaly cluster, instructions to perform a further investigation on the new candidate.

11. A non-transitory computer readable medium having stored thereon machine readable instructions, the machine readable instructions, when executed by at least one hardware processor, cause the at least one hardware processor to:
obtain log data associated with a recruitment process for a new candidate for an organization;
generate a new candidate knowledge graph by
analyzing the log data, and
generating the new candidate knowledge graph that includes entities associated with the recruitment process and relations between the entities of the new candidate knowledge graph;
generate, by using a neural network, for the new candidate knowledge graph, a new candidate graph embedding, wherein the neural network is trained to update a plurality of graph embeddings of a plurality of knowledge graphs associated with a plurality of candidates by:
generating and updating embeddings of relations and entities of each of the plurality of knowledge graphs by:
generating an objective function of the neural network based on the relations and the entities of each of the plurality of knowledge graphs associated with the plurality of candidates,
integrating a scoring function with the objective function to capture semantic meaning of the relations and the entities of each of the plurality of knowledge graphs for generating and learning meaningful representations of the relations and the entities, and
updating weights of the neural network to obtain optimal values of the objective function based on the integration of the scoring function with the objective function, wherein the weights of the neural network are updated by multiple iterations through data of the plurality of knowledge graphs; and
generating, by using one or more machine learning algorithms, a single embedding for each knowledge graph of the plurality of knowledge graphs by combining the updated embeddings of the relations and the entities of a respective knowledge graph of the plurality of knowledge graphs in a specific way, wherein the single embedding for each knowledge graph of the plurality of knowledge graphs is generated as a single n-dimensional vector for the respective knowledge graph; and
determine whether the new candidate graph embedding represents a genuine hire or a fraudulent hire.

12. The non-transitory computer readable medium according to claim 11, wherein the machine readable instructions to determine whether the new candidate graph embedding represents the genuine hire or the fraudulent hire, when executed by the at least one hardware processor, further cause the at least one hardware processor to:
determine whether the new candidate graph embedding belongs to at least one genuine candidate cluster that represents the genuine hire or to at least one fraudulent candidate cluster that represents the fraudulent hire.

13. The non-transitory computer readable medium according to claim 12, wherein the machine readable instructions, when executed by the at least one hardware processor, further cause the at least one hardware processor to:
obtain further log data associated with at least one recruitment process for the plurality of candidates;
generate the plurality of knowledge graphs by:
analyzing the further log data, and
generating, for each candidate of the plurality of candidates, a knowledge graph; and
generate, by using the neural network, the plurality of graph embeddings by generating, for each knowledge graph of the plurality of knowledge graphs, a graph embedding.

14. The non-transitory computer readable medium according to claim 13, wherein the machine readable instructions, when executed by the at least one hardware processor, further cause the at least one hardware processor to:
cluster the updated the plurality of graph embeddings to generate a plurality of embedding clusters that include the at least one genuine candidate cluster, and the at least one fraudulent candidate cluster.

15. The non-transitory computer readable medium according to claim 11, wherein the machine readable instructions, when executed by the at least one hardware processor, further cause the at least one hardware processor to:
extrapolate, based on a set of rules, the entities associated with the recruitment process for the new candidate and the relations between the entities of the new candidate knowledge graph.

16. The non-transitory computer readable medium according to claim 11, wherein the machine readable instructions to generate, for the new candidate knowledge graph, the new candidate graph embedding, when executed by the at least one hardware processor, further cause the at least one hardware processor to:
convert, for the new candidate knowledge graph, the log data into an n-dimensional vector.

17. The non-transitory computer readable medium according to claim 11, wherein the machine readable instructions, when executed by the at least one hardware processor, further cause the at least one hardware processor to:
determine whether the new candidate graph embedding belongs to a further cluster that represents an unknown anomaly cluster.

18. The non-transitory computer readable medium according to claim 17, wherein the machine readable instructions, when executed by the at least one hardware processor, further cause the at least one hardware processor to:
generate, based on a determination that the new candidate graph embedding belongs to the unknown anomaly cluster, instructions to perform a further investigation on the new candidate.

* * * * *